Patented Nov. 27, 1945

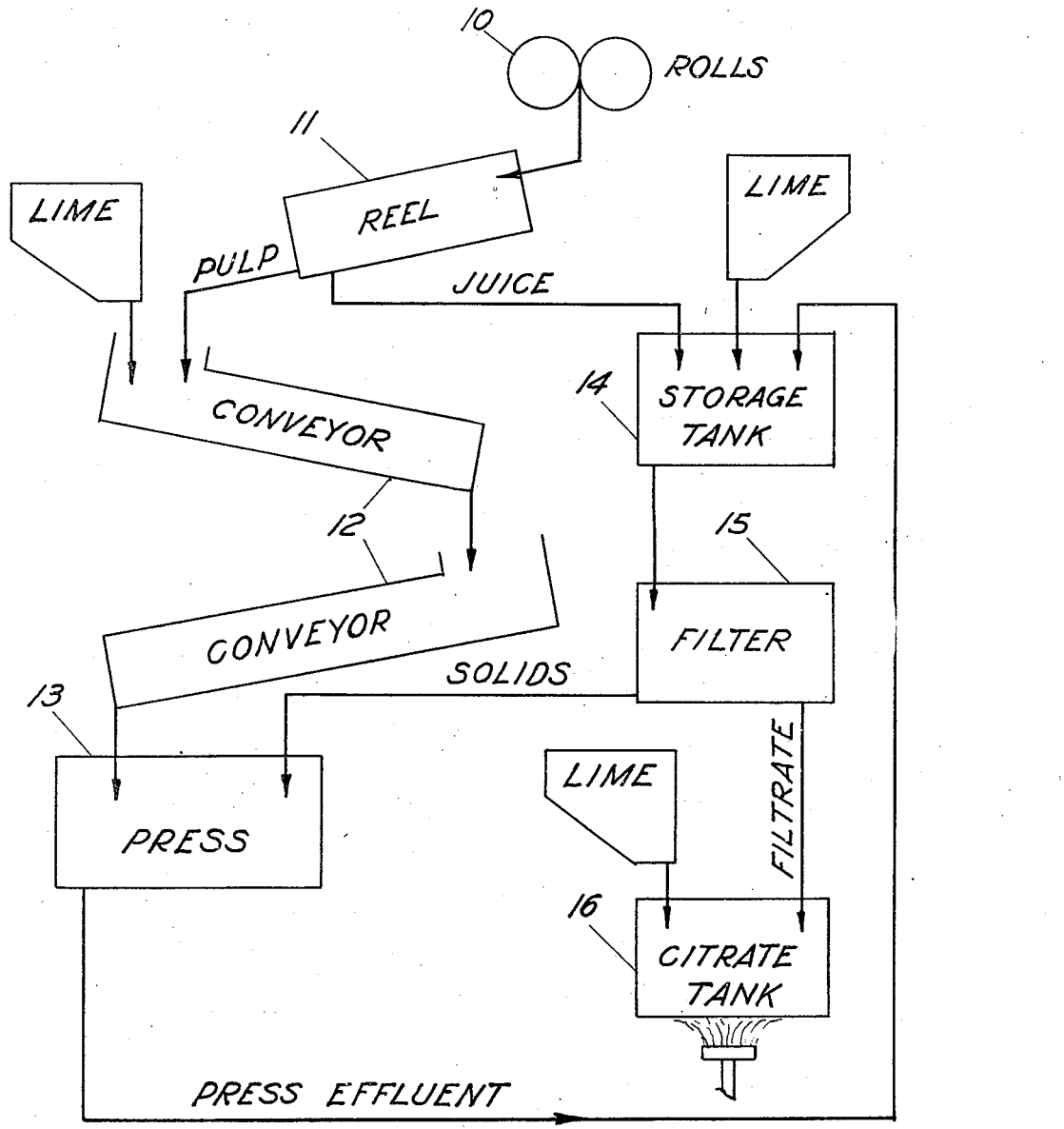

2,389,766

UNITED STATES PATENT OFFICE 2,389,766

PROCESS FOR PRODUCTION OF CALCIUM CITRATE

Gordon Manley Cole, Corona, Calif., assignor to California Fruit Growers Exchange, Los Angeles, Calif., a corporation of California Application April 22, 1941, Serial No. 389,730

4 Claims. (Cl. 260—527)

This invention deals with a process for recovering the citric acid content of citrus fruits, particularly where such acid is recovered as calcium citrate.

The broad object of my invention is to provide a process whereby calcium citrate may be produced from citrus fruits in a satisfactorily expeditious manner.

Other objects are to prepare a product of increased purity and to provide improvements shortening the time required.

Specifically I propose to improve in certain important respects upon the process disclosed in Patent No. 2,072,530 issued March 2, 1937, to Ricevuto and Bennett.

The drawing is a diagrammatic representation of the major steps in my new process, indicating equipment which may be used and following the fruit from its first reduction to the final product.

In a general way my new process involves separating and separately treating the solid matter and the juice of citrus fruit, combining the juice and the liquid recovered from the solid matter and further processing the combined mixture to produce calcium citrate.

As a detailed explanation of my process I will describe it in connection with the treatment of lemons. The lemons are first crushed to break the juice sacs, and thus free the juice from the solid portions of the fruit. This may be accomplished by passing the fruit through plain or fluted rollers, by burring the juice from the halved fruit, by use of a screw-type press or mill, or in any other desired manner, as indicated at 10 in the drawing. After this first reduction, a large part of the solid portion (peel, rag, seeds, etc.) is separated from the juice. This may be conveniently accomplished by a rotating screen, or reel, though other equivalent mechanisms may be substituted. In some cases, as for example where rolls are used, the larger pieces of peel may be delivered at a point different from that where the juice emerges, and it will be necessary only to run the juice through the reel to separate out the pulp particles of lesser size, which may then be combined with the peel. This stage is indicated by the numeral 11. The object is to attain a rough separation only, since at this stage it is not practicable and hardly possible to obtain a clear bright juice product. The two products of this treatment will be a semi-solid mass containing the major portion of the peel, rag, and seeds, and having also a moisture content of approximately 80 to 95%, and a juice containing a considerable amount of finely divided suspended matters and dissolved solids.

The semi-solid matter, which I will for convenience call pulp, is of a very obstinate nature as regards separation from it of its moisture content. This moisture content includes a considerable portion of the citric acid which it is desired to recover. It is therefore economically inadvisable to allow its loss. I propose to treat this pulp by hardening and firming the solid matter in it until the liquid may be easily expressed therefrom. In order to accomplish this, I add lime in a quantity approximately equivalent to half of the citric acid content. On another basis, the lime will ordinarily amount to from 0.5 to 2.0% on the weight of wet pulp. After a short period of time this pulp undergoes a remarkable change in character, and the liquid may, to a very large extent, be separated from the solid matter. A practical manner for liming the pulp is to add the lime at the first part of a screw conveyor (see 12), which in addition to transporting the pulp, for example to a press 13, thoroughly incorporates the lime with the pulp, and the conveyor may be so arranged and constructed that the pulp is ready to press by the time the conveyor has been traversed. As short a period as five minutes has been found successful.

The juice, which, as has been described contains a large amount of suspended matter, and is filtrable only with the greatest difficulty if at all, is treated with lime at 14 in the following manner. The hydrogen ion activity of the juice is adjusted so as to approach the optimum pH at which certain enzymes most effectively flocculate or coagulate suspended and dissolved solids which I have found to be approximately a pH range of 2.6 to 3.2, but preferably pH 2.9 to 3.0, by addition thereto of lime, and the juice is thereupon allowed to stand for a period of from about 6 to 72 hours, depending upon the temperature and possibly other conditions. At the end of this time it will be found that substantially all the suspended matter has flocculated, and separated from the juice, either by rising to the top as a cap, or by settling to the bottom. The juice may now be easily and effectively decanted and/or filtered and a clear, bright juice obtained. A filter is indicated at 15. If desired, the juice can be filtered after only a few hours, and before precipitation has occurred, though this procedure will result in greater loads on the filters.

To the clarified and filtered juice is now added an additional amount of lime sufficient to substantially neutralize the citric acid content thereof. This stage of the process is indicated at 16.

I do not consider it desirable to completely neutralize the acid. Though such treatment does tend to suppress the solubility of calcium citrate in the liquor and thus cause more citrate to be precipitated, it has also the effect of causing a dark color to develop in the solution. This is probably caused by reaction of the lime with certain elements of the citrus juice, and if allowed to occur may cause discoloration of the final product. After the lime has had a chance to react with the citric acid, calcium citrate is precipitated by heating the solution.

A number of considerations influence the amount of lime which should be added to cause hardening of the pulp. It is obviously undesirable to add lime in quantity sufficient to cause precipitation of a calcium citrate onto the pulp particles, since such undissolved citrate would thus be lost from the press effluent. On the other hand it is considered preferable to add enough lime to give good pressing quality to the pulp in a rather short time. If too little lime is used the pulp will require a longer holding period or will not readily yield a maximum liquid recovery, while if excessive amounts are used liquid recovery will be high but the citric acid content may be partially lost.

The liquor pressed from the limed pulp may be added to the juice either before or after addition of lime to the juice. I regard it as preferable to make this addition prior to adjusting the pH of the juice as described, since it results in advantages which I will disclose hereafter.

The amount of lime necessary to add to the juice will vary according to the acid content and ripeness of the fruit, and to seasonal variations. The pH range suggested is one which has been found well adapted to cause flocculation of the solid matter in the juice. This flocculation may be caused at other and different hydrogen ion concentrations, but the range suggested is regarded as preferable. It should be noted that in all cases it will be desirable to avoid precipitating either the normal or an acid calcium citrate since such precipitation prior to filtration will result in a loss.

There are numerous advantages in operating as I have disclosed. Some of these I will refer to and others will appear to those operating the process.

Removal of the peel, rag, and seeds from the juice immediately after crushing or comminution thereof avoids difficulties due to excessive extraction of the soluble pectinous matters, sugars, oil, gums, and other soluble elements.

Immediate separation of the pulp from the juice also tends to reduce solubilization of protopectin and consequent dissolution into the juice.

Treatment of the pulp separately from the juice will result in a smaller necessary total storage capacity. The pulp alone may be treated and the liquid obtained therefrom in as little time as 30 minutes, after which the pulp is ready to dispose of. The facilities for holding the limed juice may be of much less capacity than would be necessary if the pulp were left in the juice during the longer treating time needed for its clarification.

Treatment of the pulp and the juice separately allows the pulp and the juice to be handled in the most satisfactory manner. For example, it is much easier to handle the pulp as a solid and the juice as a liquid than to handle a mixture which is neither.

Speedy clarification of the juice, in addition to its obvious value in saving time, also results in allowing less trouble to be caused by molds, bacteria, yeasts, etc., some of which are known to break down the citric acid and thus to lower the yield. The shorter period does not allow sufficient time to form well developed cultures within a particular storage batch.

Treatment of the pulp and juice separately gives the operator a chance to vary treatments in accordance with seasonal and other variations in the fruit, and to thus assure best recovery of citric acid from each.

A desirable manner in which to treat the pulp is to raise its temperature to a range promoting enzyme activity, and to mix the lime in rapidly by means of a cut-flight screw conveyor. Such treatment will within a few minutes effect sufficient change in the pulp to permit efficient pressing. It may be desirable to mix pulp which has been steamed for distillation of oil with cold pulp in proper proportion to raise the temperature of the whole mass to a proper degree.

Temperature of the juice will affect its time for clarification, and possibly it will be worth while to raise it to within a range of 40° to 55° C. when the normal temperature would be too low for best results.

In the addition of lime, I prefer in practice to employ calcium hydroxide, or hydrated lime, for reasons of economy and safety in handling. Calcium oxide and calcium carbonate are, of course, available, from a chemical standpoint, although these and other calcium compounds might be less desirable in practice. Substitutions can of course be made, but I know of nothing more suitable for my purposes than calcium hydroxide for adjusting the hydrogen ion activity of the lemon juice to the proper value. By using a calcium compound for this purpose, part of the calcium ion commonly used in processes for recovering citric acid is added at the same time the acid is partially neutralized.

While I regard the actions I have described as due at least in part to enzymes, both in the treatment of pulp and in the treatment of juice, I am aware that such view may not be held by all, and do not wish to be considered as bound to this theory.

I claim:

1. A process for producing calcium citrate, comprising comminuting citrus fruit, roughly separating the comminuted fruit product thus obtained into a juice portion containing dissolved and suspended solid matter and a pulp portion having from 80 to 95% moisture content, hardening the pulp by treatment with lime sufficient to neutralize about 50% of its citric acid content, pressing the hardened pulp to release a substantial part of its liquid content as a press effluent, adding press effluent and lime to the juice to adjust the hydrogen ion activity of the juice to within a pH range of 2.6 to 3.2, storing the juice for from 6 to 72 hours to allow flocculation, clarifying the juice, substantially neutralizing the clarified juice with lime, and heating the solution to precipitate calcium citrate.

2. A process for producing calcium citrate from citrus fruit comprising comminuting the fruit, roughly separating the comminuted fruit product thus obtained into a juice portion and a pulp portion, hardening the pulp by addition of lime, thereafter pressing the pulp to recover a substantial portion of its liquid content to form a liquid portion, adjusting the hydrogen ion activity of the juice to within a pH range of about 2.6 to about 3.2, adding a liquid portion to a juice portion subsequent to the rough separation of juice and pulp and prior to storage, thereafter storing the juice for a time sufficient to allow flocculation to take place, clarifying the juice, and then substantially neutralizing with lime, and heating to precipitate calcium citrate.

3. A process for producing calcium citrate from citrus fruit comprising comminuting the fruit, roughly separating the comminuted fruit product thus obtained into a juice portion and a pulp portion, hardening the pulp by addition of lime, thereafter pressing the pulp to recover a substantial portion of its liquid content, adding the liquid so recovered and lime to a juice portion to adjust the hydrogen ion activity of the juice to within a pH range of about 2.6 to about 3.2, storing the juice for a time sufficient to allow flocculation to take place, clarifying the juice, substantially neutralizing with lime, and heating to precipitate calcium citrate.

4. A process for producing calcium citrate from citrus fruit comprising comminuting the fruit, roughly separating the comminuted fruit product thus obtained into a juice portion and a pulp portion, adding lime to the pulp portion in an amount equal to between 0.5 to 2.0 percent by weight of the pulp, mixing the added lime with the pulp, thereafter pressing the pulp to recover a substantial portion of its liquid content to form a press liquid portion, adjusting the hydrogen ion activity of the juice portion to within a pH range of about 2.6 to about 3.2 by the addition of lime, combining the juice portion and press liquid portion and storing the combined liquid for a time sufficient to allow flocculation to take place, clarifying the combined liquid and subsequently neutralizing the clarified liquid with lime and heating to precipitate calcium citrate.

GORDON MANLEY COLE.